No. 846,427. PATENTED MAR. 5, 1907
R. RICHTER.
ALTERNATING CURRENT MACHINE WITH COMMUTATORS AND WITH COMPENSATING WINDINGS.
APPLICATION FILED AUG. 28, 1906.

Witnesses
W. P. Hammond
Emily Lee

Inventor
Rudolf Richter
By Knight Bros
Attorneys

UNITED STATES PATENT OFFICE.

RUDOLF RICHTER, OF CHARLOTTENBURG, GERMANY, ASSIGNOR TO SIEMENS-SCHUCKERT-WERKE, G. M. B. H., OF BERLIN, GERMANY, A CORPORATION OF GERMANY.

ALTERNATING-CURRENT MACHINE WITH COMMUTATORS AND WITH COMPENSATING WINDINGS.

No. 846,427. Specification of Letters Patent. Patented March 5, 1907.

Application filed August 28, 1906. Serial No. 332,359.

*To all whom it may concern:*

Be it known that I, RUDOLF RICHTER, a subject of the Emperor of Germany, and a resident of Charlottenburg, Berlin, Germany, have invented new and useful Improvements in Alternating-Current Machines with Commutators and with Compensation-Windings.

The present invention relates to alternating-current machines with commutators and with compensation-windings, and an important object is an alternating-current machine having a commutator and having a compensation-winding connected in series with the armature and having auxiliary fields for canceling the electromotive forces generated in the short-circuited armature-coils by the pulsating main field, in which machine the compensation-winding or a part of it is simultaneously used for producing the auxiliary field, an electromotive force being applied to it or to the said part of the same, which electromotive force is supplied from the secondary winding of a transformer connected in parallel with the machine.

The present invention consists in an improved alternating-current machine having a commutator and a compensation-winding, and in order that the details of construction and action of my invention may be more clearly understood, reference is made to the accompanying drawings, in which—

Figure 1:
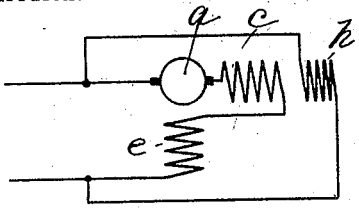
Figure 2:
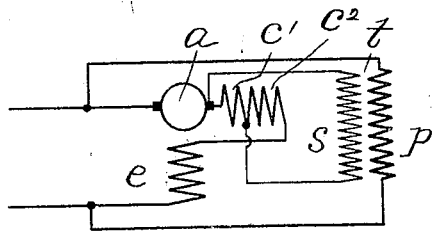
Figure 3:
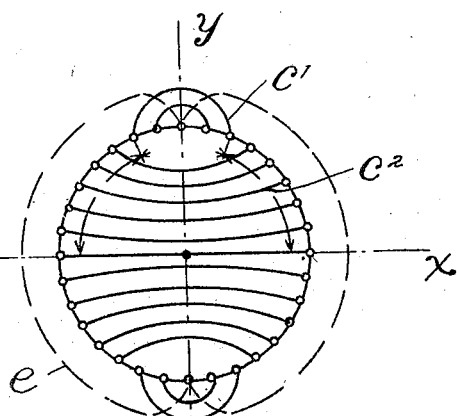
Figure 4:
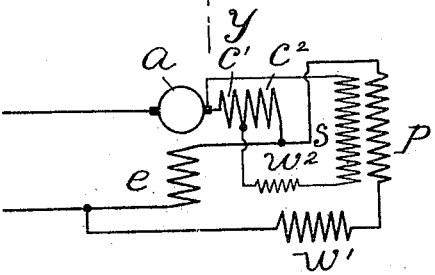

Figure 1 shows diagrammatically a machine hitherto used with a special winding in parallel to the terminals of the machine. Fig. 2 shows diagrammatically a machine in accordance with the present invention, in which a transformer is connected in parallel with the machine. Fig. 3 shows diagrammatically the distribution of the compensation-winding for a two-pole machine. Fig. 4 shows diagrammatically another form of the present invention in which a transformer is connected in parallel with only one part of the machine.

The electromotive force which arises in the short-circuited armature-winding of alternating-current machines with commutators in consequence of the pulsating main field may be canceled, as is known, by an auxiliary field of suitable phase and strength in the neutral zone. Hitherto a special winding $h$, Fig. 1, has been employed for this purpose, said winding having the same axial position as the compensation-winding $c$ and may be connected to the terminals of the machine of which the armature is indicated by $a$ and the exciting-winding by $e$ in the figure.

The special auxiliary winding $h$, Fig. 1, can be made superfluous if an electromotive force of suitable phase and strength is applied to the compensation-winding $c$ or to a part of the same without otherwise altering its connection. Preferably only a part of the compensation-winding is employed for this, as is indicated in Fig. 2, the compensation-winding consisting of the two parts $c_1$ and $c_2$. Such an electromotive force is applied to the part $c_1$ that this part of the winding creates the same field as the special auxiliary winding according to Fig. 1. Now this electromotive force is preferably obtained by means of a transformer $t$, of which the primary winding $p$ is connected to the net in parallel with the machine, while the part $c_1$ of the compensation-winding is fed by the secondary winding $s$ with current of suitable phase and strength. The part $c_1$ of the compensation-winding, which is, generally speaking, uniformly distributed, which part is preferably used for producing the auxiliary field, is situated in conformity with its purpose next to the neutral zone, for no auxiliary field is required outside the range of the short-circuiting of the brushes, but the total load factor is the greater the less the auxiliary field is extended.

The distribution of the winding for a two-pole motor is diagrammatically represented in Fig. 3, in which drum-winding is supposed. The exciting-winding (which is concentrated as much as possible) with the axis $x\ x$ is indicated by dotted lines $e\ e$. The distributed compensation-winding with the axis $y\ y$ is divided into two parts in each half of the stator—i. e., the central part $c_1$, to which the secondary transformer-winding $s$, Fig. 2, is connected, and the outer part $c_2$. The connections of the active conductors may of course run otherwise than as indicated in the figure.

The validity of the above explanation holds perfectly good if the transformer-winding $p$ is not connected in parallel with the whole machine, as shown in Fig. 2, but with only one part of the machine—for example, with the armature or only with the field-winding e. This latter case is represented in Fig. 4, of which the reference-letters agree with those of Fig. 2. In order to maintain the correct phase in the auxiliary winding, resistances $w_1$ and $w_2$ must be inserted in the primary and secondary circuits of the transformer, respectively, or in one of them.

While the construction of parts which is preferred has been described in the foregoing specification, I am aware that numerous changes of construction may be made without departing from the spirit and scope of my invention, and I therefore do not wish to be understood as limiting myself by the positive terms employed in connection with the description, excepting such as the state of the art may require.

What I claim as my invention, and desire to secure by Letters Patent, is—

1. The combination, in an alternating-current machine of the type described, of an armature-winding, a compensation-winding connected in series thereto, a field-magnet winding connected to said compensation-winding, means connected electrically directly with said compensation-winding adapted to produce a difference of potential between one part of the compensation-winding and another part of the same whereby an auxiliary field is produced, for the purpose specified.

2. The combination, in an alternating-current machine of the type described, of an armature-winding, a compensation-winding connected in series thereto, a field-magnet winding connected to said compensation-winding, means connected electrically directly with said compensation-winding adapted to produce a difference of potential between the one end and the other end of the same whereby an auxiliary field is produced, for the purpose specified.

3. The combination, in an alternating-current machine of the type described, of an armature-winding, a compensation-winding connected in series thereto, a field-magnet winding connected to said compensation-winding, the primary winding of a transformer connected to two parts of said machine between which a difference of potential normally exists, the secondary winding of said transformer connected to two different parts of said compensation-winding whereby an auxiliary field is produced, for the purpose specified.

4. The combination, in an alternating-current machine of the type described, of an armature-winding, a compensation-winding connected in series thereto, a field-magnet winding connected to said compensation-winding, the primary winding of a transformer, a resistance in series with the same, said primary winding and resistance being connected in parallel with said field-magnet winding, the secondary winding of said transformer connected to two different parts of said compensation-winding whereby an auxiliary field is produced, substantially as described.

5. The combination, in an alternating-current machine of the type described, of an armature-winding, a compensation-winding connected in series thereto, a field-magnet winding connected to said compensation-winding, the primary winding of a transformer connected in parallel with said field-magnet winding, the secondary winding of said transformer, a resistance in series with the same, said secondary winding and said resistance being connected to two different parts of said compensation-winding, whereby an auxiliary field is produced, substantially as described.

6. The combination, in an alternating-current machine of the type described, of an armature-winding, a compensation-winding connected in series thereto, a field-magnet winding connected to said compensation-winding, the primary winding of a transformer, a resistance in series with the same, said primary winding and said resistance being connected in parallel with said field-magnet winding, the secondary winding of said transformer, a resistance in series with the same, said secondary winding and said latter resistance being connected to two different parts of said compensation-winding, whereby an auxiliary field is produced, substantially as described.

RUDOLF RICHTER.

Witnesses:
WOLDEMAR HAUPT,
HENRY HASPER.